Oct. 23, 1923.
C. J. COBERLY
MOTION PICTURE FILM
Filed Aug. 13, 1919.
1,471,592
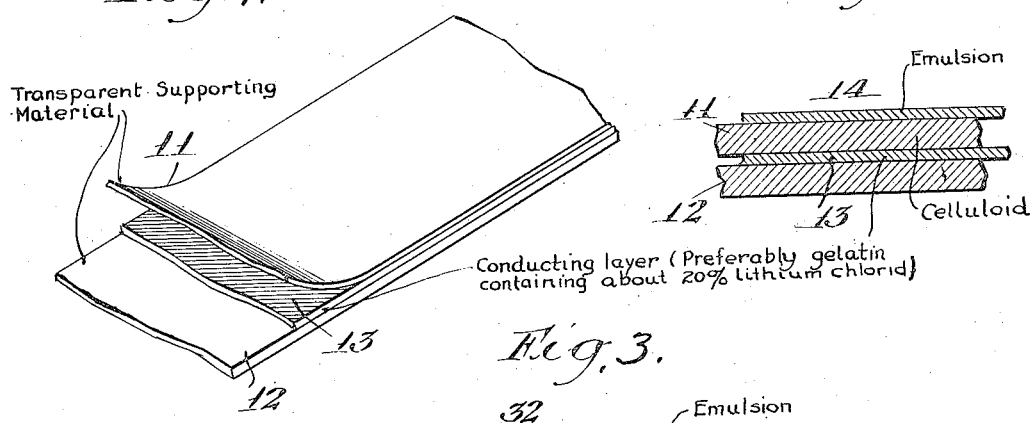
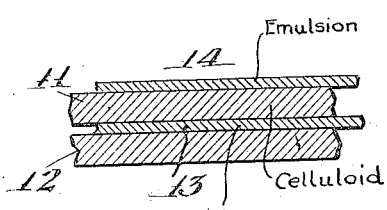
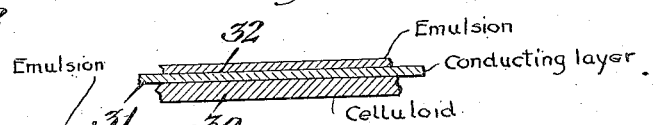
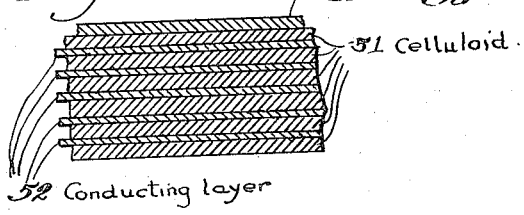
Inventor
Clarence J. Coberly
by Graham & Hurd Patented Oct. 23, 1923.

1,471,592

UNITED STATES PATENT OFFICE.

CLARENCE J. COBERLY, OF LOS ANGELES, CALIFORNIA.

MOTION-PICTURE FILM.

Application filed August 13, 1919. Serial No. 317,163.

*To all whom it may concern:*

Be it known that I, CLARENCE J. COBERLY, a citizen of the United States, residing at Los Angeles, in the county of Los Angeles and State of California, have invented a new and useful Improvement Comprising a Motion-Picture Film, of which the following is a specification.

My invention relates to motion picture films and an object of the invention is to provide means for preventing the film from being marked by disruptive discharges of static electricity. Static electricity is at the present time a source of considerable loss in the motion picture industry, due to the fact that charges of this electricity are collected on the film, discharging over the surface thereof, and thereby producing a marking which ruins the film for projection purposes. These markings may be formed during the process of manufacture, but it is probable that the great majority of such markings are produced in the camera due to friction or induction or both. It is often necessary to retake scenes due to the fact that the film is found marred by static markings after it has been developed, thus causing considerable losses.

These static markings are undoubtedly due to the fact that the celluloid of which the films are ordinarily made is a fairly good insulator so that considerable potentials may be built up thereon with the result that when they discharge they produce these objectionable markings. If it were possible to provide a transparent material which was a good conductor of electricity and to substitute this material for the celluloid, ordinarily used, these static markings could be prevented, for the reason that the charges would be conducted away from the film as fast as they were formed without the disruptive discharges which produce the actinic rays which cause the markings on the film. I am not aware of any substance which would be suitable for the manufacture of film which is a good conductor, but I have found that the ordinary celluloid film, or support can be coated with material which is a good conductor and that when so coated troubles with static entirely disappear. One method of accomplishing this is to deposit on the surface of the celluloid a fine layer of highly hygroscopic material, this material collecting moisture from the air and maintaining a fine layer of moisture on the surface of the film through which any electrical charges are electrolytically conducted to the conducting members of the camera. I have disclosed a method by which this may be accomplished in my application Serial No. 147,505, filed February 8, 1917. The present application comprises an improvement in the invention set forth in the earlier application.

I have found while it is very easy and quite practical to provide a coating which may be applied by any one to any film, that it is perhaps better to incorporate a conducting layer in the film itself at the time of manufacture and I disclose such a film and a method of producing it herein. In the annexed drawing which is entirely diagrammatic and for illustrative purposes only, Fig. 1 is a perspective view of the film with the various layers turned back.

Fig. 2 is a section on a very much enlarged scale showing a film with the layer sandwiched between two layers of celluloid.

Fig. 3 is a similar view showing the conducting layer placed between the sensitized emulsion and the celluloid support.

Fig. 4 is a section on a very much enlarged scale through still another form of my invention.

The film shown in Figs. 1 and 2 consist of two layers 11 and 12 of transparent supporting material such as celluloid between which is confined a conducting layer 13 which can conveniently be formed of a thin layer of gelatine or other colloidal binder which contains a hygroscopic salt, or an electrolyte, lithium chloride being a convenient substance to use in this connection. The sensitized emulsion 14 is placed on one side of the celluloid.

The gelatine solution may consist of the following materials: Distilled water, 450 cubic centimeters, 90% grain alcohol, 550 cubic centimeters, hard gelatine, 10 grams, lithium chloride, 2 to 2½ grams.

The gelatine layer 13 may be very thin, the lithium chloride therein tending to keep it moist by absorbing moisture from the air. The charges formed on the surface of the film leak through the celluloid coating to the conducting layer 13 through which these electrical charges are electrolytically conducted away without disruptive discharges.

I have also found that the type of film shown in Fig. 3 will also prevent static. This film consisting of a celluloid support 30 and conducting layer 31 upon which the sensitized emulsion 32 is placed. This film is produced by omitting the second celluloid layer, the sensitized emulsion being deposited directly upon the conducting layer.

My invention depends on the fact that celluloid while an insulator is not a very perfect one as it tends to absorb and hold moisture. The celluloid layers are quite thin and charges of electricity formed on either surface readily leak or are conducted through the celluloid to the conducting layer beneath as fast as these charges are formed and without disruptive discharges. This is of course due to the large area and extremely short length of the conducting path the area being equal to the area of the film on which the charge accumulates and the length being the thickness of the film.

While I have shown a single conducting layer sandwiched between moderately thick supporting layers, it it possible to produce a very satisfactory film by building up alternate layers of gelatine and celluloid each of these layers being very thin so that the conducting material is very uniformly and completely distributed throughout the body of the film. This method of construction is illustrated in Figure 4, in which the emulsion 50 is carried on a support formed of celluloid layers 51, between which are distributed conducting material 52. This general distribution of the conducting material through the film can be carried to any desired degree, the number of conducting layers being made of any desired number.

I claim as my invention:—

1. A motion picture film comprising: a supporting strip; a layer of sensitized emulsion; and a transparent layer of high electrical conductivity between said strip and said emulsion.

2. A motion picture film comprising: a supporting strip; a layer of sensitized emulsion; and a transparent conducting layer of sufficiently high electrical conductivity to prevent the static markings which would be formed in said emulsion under ordinary conditions of use were such conducting layer not present, said conducting layer being between said emulsion and said supporting strip.

3. A motion picture film having a layer containing an electrolyte, said electrolyte being sufficiently electrically conducting to prevent, under the ordinary conditions of use of said film, the static markings which would be produced by such use were said electrolyte not present.

4. A motion picture film having a layer containing an electrolyte carried in a suitable binder, said electrolyte being sufficiently electrically conducting to prevent, under the ordinary conditions of use of said film, the static markings which would be produced by such use were said electrolyte not present.

5. A motion picture film comprising: a layer of sensitized emulsion; two supporting strips of transparent material; and a transparent layer of high electrical conductivity between said strips.

6. A motion picture film comprising: a layer of sensitized emulsion; a supporting strip of transparent material, said layer and strip being so constituted, if used alone, that static marking would be produced in said emulsion under ordinary conditions of use; and material of sufficiently high electrical conductivity to prevent said markings, said material being incorporated in and carried by said strip.

7. A motion picture film comprising: a layer of sensitized emulsion; a supporting strip or transparent material, said layer and strip being so constituted, if used alone, that static marking would be produced in said emulsion under ordinary conditions of use; and hygroscopic material of sufficiently high electrical conductivity to prevent said markings, said material being incorporated in and carried by said strip.

In testimony whereof, I have hereunto set my hand at Los Angeles, California, this 8th day of August 1919.

CLARENCE J. COBERLY.